United States Patent [19]

Banker et al.

[11] Patent Number: 5,357,276
[45] Date of Patent: Oct. 18, 1994

[54] METHOD OF PROVIDING VIDEO ON DEMAND WITH VCR LIKE FUNCTIONS

[75] Inventors: Robert O. Banker, Cumming; Jeffrey B. Huppertz, Alpharetta; Michael T. Hayashi, Lawrencevile; David B. Lett, Duluth; Voytek E. Godlewski, Atlanta; Michael W. Raley, Lilburn, all of Ga.

[73] Assignee: Scientific-Atlanta, Inc., Norcross, Ga.

[21] Appl. No.: 984,038

[22] Filed: Dec. 1, 1992

[51] Int. Cl.⁵ .................... H04N 7/16; H04N 7/173
[52] U.S. Cl. ............................... 348/7; 348/12; 455/4.2
[58] Field of Search .............. 358/86; 455/6.1, 4.2, 455/5.1, 6.2; 380/5, 7, 10, 20, 23; 348/6, 7, 8, 13; H04N 7/173, 7/16

[56] References Cited

U.S. PATENT DOCUMENTS

| | | | |
|---|---|---|---|
| 4,949,187 | 8/1990 | Cohen | 358/86 |
| 4,995,078 | 2/1991 | Monslow | 358/86 |
| 5,027,400 | 6/1991 | Baji et al. | 348/10 |
| 5,130,792 | 7/1992 | Tindell et al. | 348/7 |
| 5,172,413 | 12/1992 | Bradley | 358/86 |
| 5,206,722 | 4/1993 | Kwan | 358/86 |
| 5,247,347 | 9/1993 | Litteral et al. | 348/7 |

Primary Examiner—Mark R. Powell
Assistant Examiner—Chris Grant
Attorney, Agent, or Firm—Frederick W. Powers, III; Steven C. Stewart

[57] ABSTRACT

A near video on demand time shifting feature for a subscriber terminal emulates the video cassette recorder functions of pause, fast forward, and rewind for a NVOD service subscription. The subscriber terminal stores global transactions concerning NVOD events in an event portion of memory. The subscriber terminal provides an on screen display feature for assisting in ordering the NVOD service and a user interface which provides the functions of pause, fast forward and rewind. When viewing a NVOD event, if the subscriber selects the pause function, the subscriber terminal causes a pause on screen display to be viewed for one time increment. After the elapse of the time increment, the subscriber terminal will tune the channel of the next showing which is one time increment earlier than that presently viewed. If the subscriber selects the rewind function, the subscriber terminal will tune the channel of the next showing which is one time increment earlier than that presently viewed. If the subscriber selects the fast forward function, the subscriber terminal will tune the channel of the previous showing which is one time increment later than that presently received.

4 Claims, 13 Drawing Sheets

EVENT DATA 1-6

ED1

| EVENT ID (2) | PREVIEW TIME (1) | DISPLAY CHANNEL (2) | MAX # SHOWINGS (2) |
|---|---|---|---|

| PURCHASE WINDOW (1) | BARKER FREQ. (1) | OS BARKER (2) | ATTRIBUTES (1) |
|---|---|---|---|

| INTERVAL (1) | START TIME (6) |
|---|---|

ED2

| EVENT ID (2) | # OF FREQ. (1) | FREQ. LIST 1-16 (16) |
|---|---|---|

ED3

| EVENT ID (2) | BLANK (1) | FREQ. LIST 17-24 (8) | SHOWING LENGTH (2) |
|---|---|---|---|

| END TIME (6) |
|---|

ED4

| EVENT ID (2) | BLANK (1) | MODE 1-8 (8) | PPV DEF (8) |
|---|---|---|---|

ED5

| EVENT ID (2) | BLANK (1) | PPV DEF (16) |
|---|---|---|

ED6

| EVENT ID (2) | BLANK (1) | MISC. DATA (16) |
|---|---|---|

*FIG. 4*

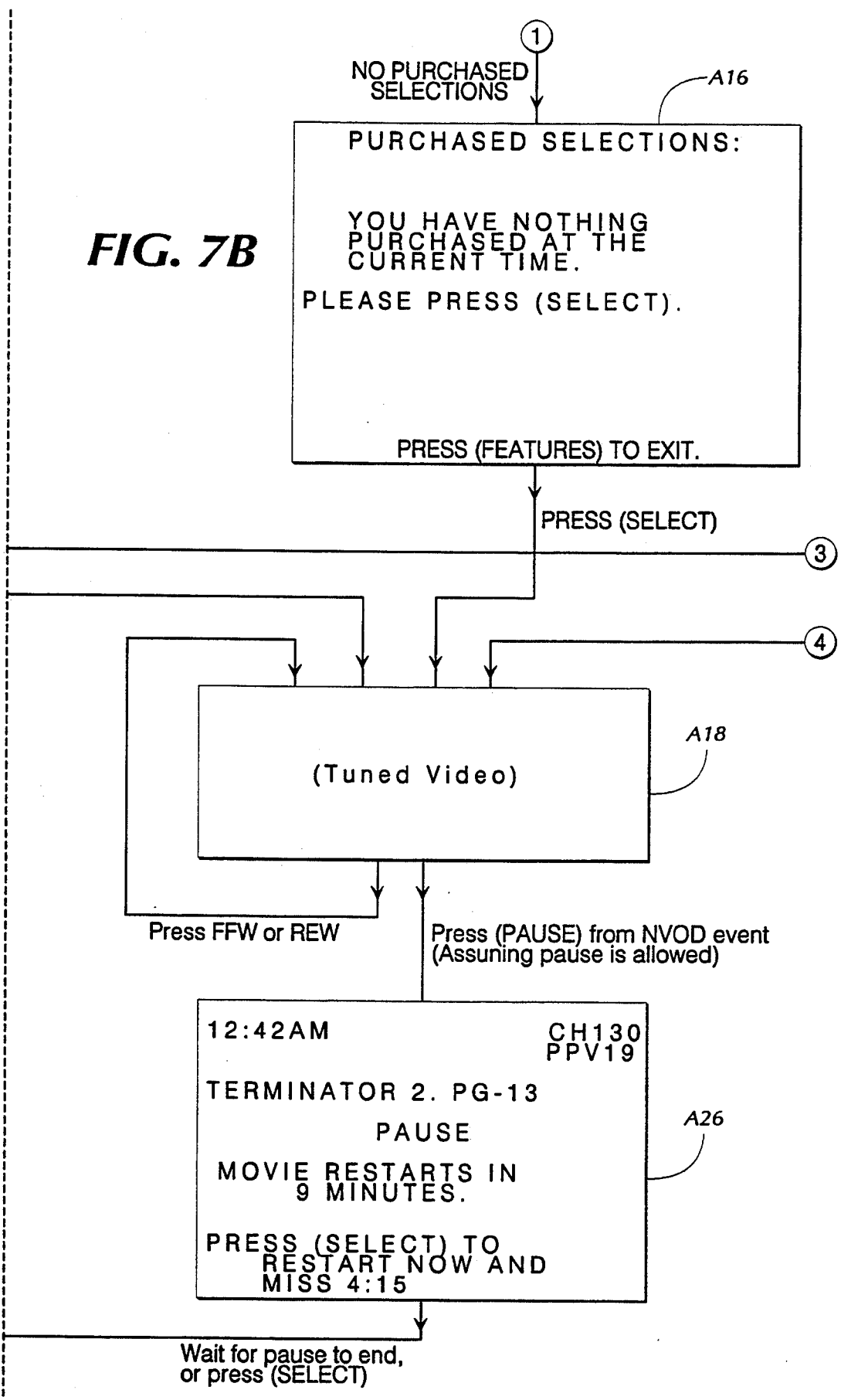

METHOD OF PROVIDING VIDEO ON DEMAND WITH VCR LIKE FUNCTIONS

The present invention relates generally to a system (method and apparatus) of providing premium programs of events broadcast on premium channels of a subscriber television system.

It is known in subscriber television systems, including those of the CATV type, to provide means for subscribers to obligate themselves to pay for programs of individual events, either advanced in time of the broadcast of the event over the CATV system or on demand. These features enhance the subscriber's enjoyment of the system by providing pay-per-view (PPV) and impulse pay-per-view (IPPV) capabilities.

In the past, a pay-per-view event has been ordered through the use of a telephone call from the subscriber to the cable operator who then authorizes the subscriber to receive the program event, usually by sending an authorization signal which activates a descrambler in the subscriber terminal. Since time is required to allow the cable operator to authorize the subscriber terminal to allow viewing of the event, the purchase must be ordered well in advance of the time that it is broadcast. Other systems utilize the subscriber terminal as a subscriber interface. The subscriber terminal is tuned by the subscriber to select a premium channel and then the subscriber enters an authorization number. The subscriber terminal activates its descrambler to allow the broadcast on the selected premium channel to be viewed. Information regarding the purchase can be stored by the subscriber terminal and an interface provided with a telephone connection circuit which places calls to the cable operator (or a reverse signaling path with an RF transmitter which transmits the information back over the distribution system to the cable operator) and transfers data as to the pay-per-view events which were selected.

These previous systems allow the ordering of one event, at a predetermined time, which the broadcaster and the cable operators have agreed upon. If the subscriber is unavailable at that time or does not have a time shifting device such as a video cassette recorder (VCR), then the event will be missed with the loss of consumer satisfaction and cable operator revenue. To answer the need for allowing the subscriber more flexibility of when to order a pay-per-view event, the industry has now initiated programming termed near video on demand (NVOD). In the NVOD programming, the program event, for example a first run movie, is broadcast continuously on a single channel or multiple channels. This allows the subscriber much greater flexibility in selecting the time that he wants to either record or watch the particular program event. To increase this flexibility the event can be duplicated on several channels where the starting time of the event on each channel is offset by predetermined increment of time. Depending upon the number of channels and the length of the event, the subscriber will have to wait only one offset time increment until the program event next starts on an adjacent channel. Increasing the number of channels reduces the amount of time that a subscriber has to wait until the start of the program event and increases his satisfaction with the service. As an example, if the program event is one hour long, and there are four channels, and the start time of the program event on each channel is equally offset, then the subscriber will at most wait 15 minutes to the start of the next broadcast of the event.

Because of the flexibility of this type of premium programming, the way the service is marketed should also be quite different. Instead of paying a one time, one event price for a particular program event there must be a different compensation structure because the subscriber can watch the program event at any time and possibly watch the event more than once. A buying window of several viewing broadcasts, or a set period of time, usually a day or a week is created to permit this to happen. The near video on demand service then becomes almost equivalent to renting a VCR tape which can be watched at the subscriber's leisure and according to his schedule.

There are still several drawbacks that somewhat restrict the flexibility of the subscriber in this type of service even today. The first drawback which does not occur in a VCR tape rental is, if for some reason during a viewing of a program event the subscriber wishes to stop watching, he will then have to select a broadcast time for the event all over again. Normally, the near video on demand service will only tune to the channel which will next start the broadcast of the program event.

Further, it is recognized that one of the features desired by a subscriber in a normal VCR tape rental situation is fast forward and rewind. During the viewing of a program event for the second or third time there are favorite scenes, situations, sports plays, etc. that the subscriber will wish to view more than once but would like to not have to wait until they occur if he starts the program at the beginning. The same is true for rewinding a VCR tape from a particular point where a scene would like to be reviewed at a particular instance. The present near video on demand service does permit this time shifting function of being able to shift forward, backward or to pause.

SUMMARY OF THE INVENTION

The invention provides a time shifting feature for a subscriber terminal which is capable of receiving a plurality of NVOD channels from a programming source.

In a preferred embodiment, the time shifting feature includes a method and an apparatus for providing operations which emulate the functions of pause, fast-forward and rewind of a video cassette recorder. These features allows a subscriber to move forward, backward or pause in single offset time increments in response to user selection when viewing a NVOD event. In response to a user indication to fast forward, the method tunes the subscriber terminal to the NVOD channel which is showing the program event, but which started the event one time period earlier than the channel the subscriber is presently watching. In response to a user indication to rewind, the method tunes the subscriber terminal to the NVOD channel which is showing the program, but which started the event one time period later than the channel the subscriber is presently watching. In response to a user indication to pause, the method overlays the receiver screen for one time period with a pause on screen display and then tunes to the NVOD channel which started the event one time period later than the channel which the subscriber is presently watching. This action allows the subscriber to essentially stop the action of the event for one time period.

BRIEF DESCRIPTION OF THE DRAWINGS

These and other objects, features and aspects of the invention will be more clearly understood and better described if the following detailed description is read in conjunction with the appended drawings wherein:

FIG. 4 is a pictorial representation of a program event transaction which can be stored in an event memory;

DETAILED DESCRIPTION OF THE PREFERRED EMBODIMENT

Figure 1:
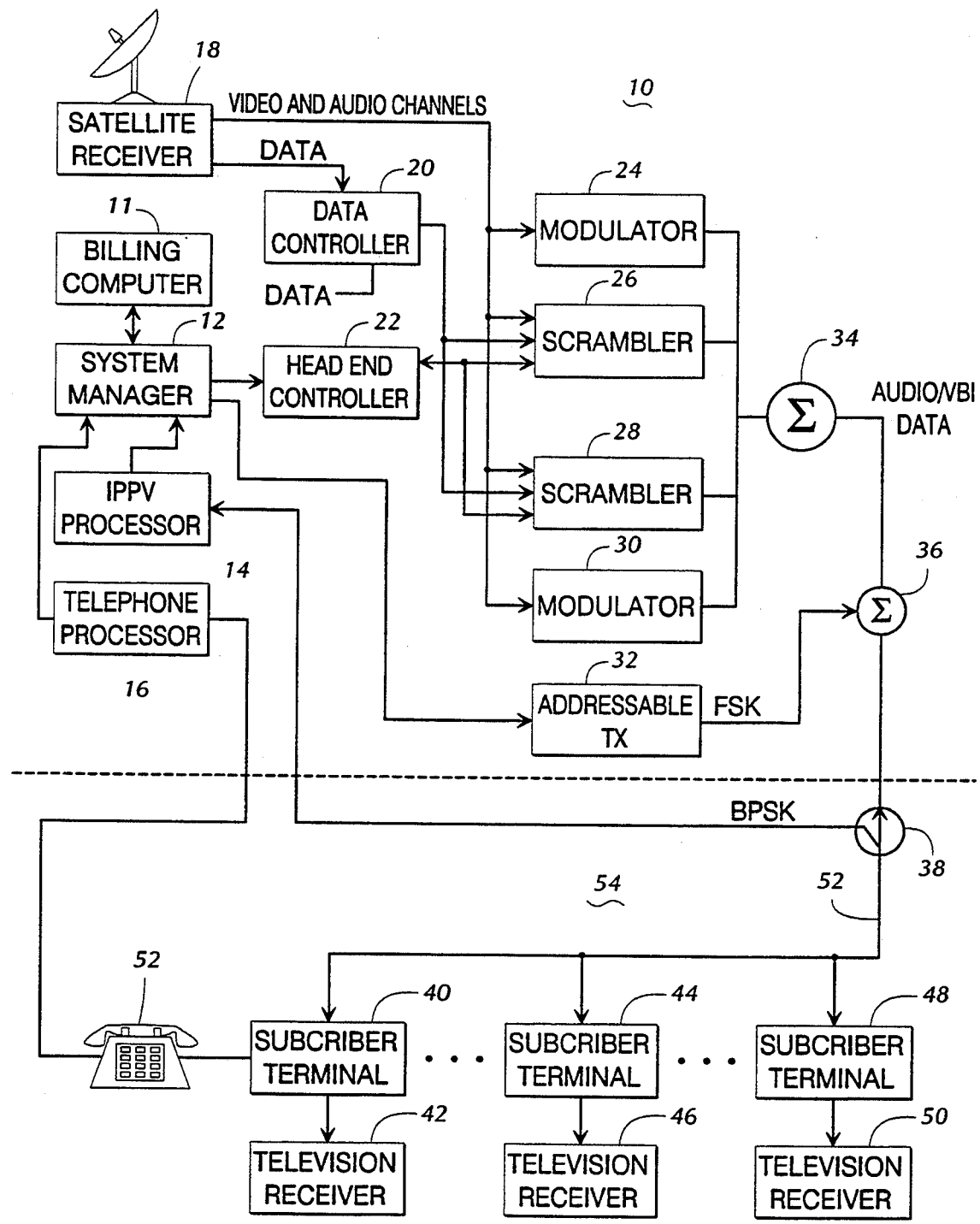
FIG. 1 is a system block diagram of a subscription television system of the CATV type which includes a multiplicity of subscriber terminals.

A subscription television system of the CATV type is more fully illustrated in FIG. 1. The subscription television system includes a headend 10 and a plurality of subscriber terminals 40, 44 and 48 which are connected over a distribution system 52. As is conventional, the distribution system 52 may include coaxial or optical fiber cable, system amplifiers, line extenders, etc. The headend 10 is under the supervision of a system manager 12 which controls a hardware controller, headend controller 22. A billing computer 11 communicates with the system manager 12 to authorize and transmit transactions to subscribers.

The television or other programming for the subscription system may come from a satellite downlink where it is decoded and demodulated by satellite receivers 18 into a number of channels. Each channel is either applied to a modulator 24 and 30 or a scrambler 26 and 28 which, under the control of the headend controller 22, remodulates the channels to the frequencies of the local subscription system channel line up. For a premium or restricted channel service (tiered, pay-per-view, or the like), some channels are scrambled by any of the known CATV methods by the scramblers (26, 28) and modulators (24, 30). While the other channels can be transmitted without conversion. The program channels are then frequency division multiplexed onto the distribution system 52 by an RF combiner 34 as a broadband television signal. The plurality of channels of programming can then be transmitted over the distribution system 52 and supplied to each of the subscriber terminals 40, 44, and 48.

The scramblers and modulators 26 and 28 further may include the function of data insertion for its particular channel. This method of providing the data within the channel signal is generally termed in-band signaling. The data may be applied to any audio portion, video portion or both audio and video portions in combination, or any other portion of the television channel. Many subscription television systems have amplitude modulated data pulses on the audio subcarrier. Further, in other subscription television systems, data may be inserted into the vertical and/or horizontal blanking intervals of the video portion.

The data which is inserted into the television channel in this manner can be conditional access data to globally or locally address and control the subscriber terminals 40, 44 and 48, on screen text data, or other types of information from the headend controller 22. Other data and information, such as electronic program guides and information services, can be inserted into the channels from a data controller 20. The data controller 20 can receive local data or national data from the satellite downlink through the satellite receiver 18.

In addition, data can be transmitted over the distribution system 52 by out-of-band signaling. In this mode, the system manager 12 accesses an addressable transmitter 32 with transactions to transmit this data. The addressable transmitter 32 may be used to modulate a data signal on a frequency not associated with the television programming. The broadband television programming of the cable systems has generally been applied from 50 MHz to 550 MHz and above, while out-of-band signaling systems have been used in non-video portions of these signals, such as at 108.2 MHz with a frequency shift keying modulation technique. These transactions are combined with the broadband television signal at 36 and transmitted to the subscriber terminals 40, 44 and 48.

Transactions in the system are designated as addressed (to a particular subscriber terminal or group of subscriber terminals) and global (to all subscriber terminals). These transactions are in a standardized format which can be sent over any of the communication paths mentioned.

Signaling and data information may also flow in the reverse direction from the subscriber terminals to the headend via a reverse signaling path through the distribution system 52. In one form, the reverse signals are digital biphase shift keying (BPSK) modulated and applied to a frequency below 50 MHz. The signals flow back from the subscriber terminals to an IPPV processor where they are decoded. In addition, any of the subscriber terminals 40, 44 and 48 may include a modem and telephone link 52 to a telephone processor 16 at the headend 10. The information from processors 14 and 16 are directed to the system manager 12, which communicates to the billing computer 11 to obtain authorization and billing information. The reverse signaling system has generally been used for ordering pay-pay-view (PPV) or impulse-pay-per-view (IPPV) events. In the future the reverse signal path may be used for any number of additional interactive services.

Figure 2A:
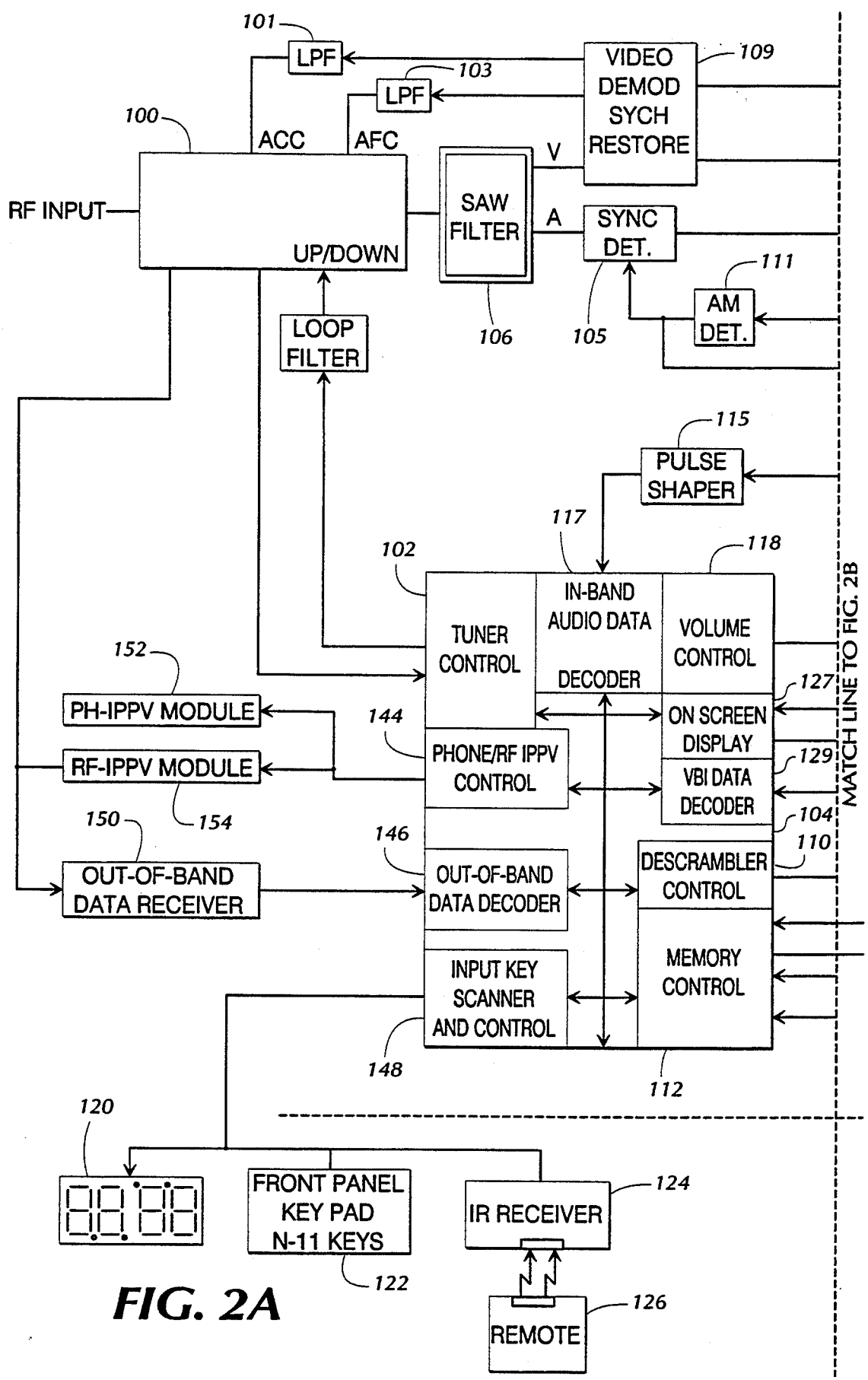
FIGS. 2A and 2B are a detailed block diagram of one of the subscriber terminals of the system illustrated in FIG. 1.
Figure 2B:
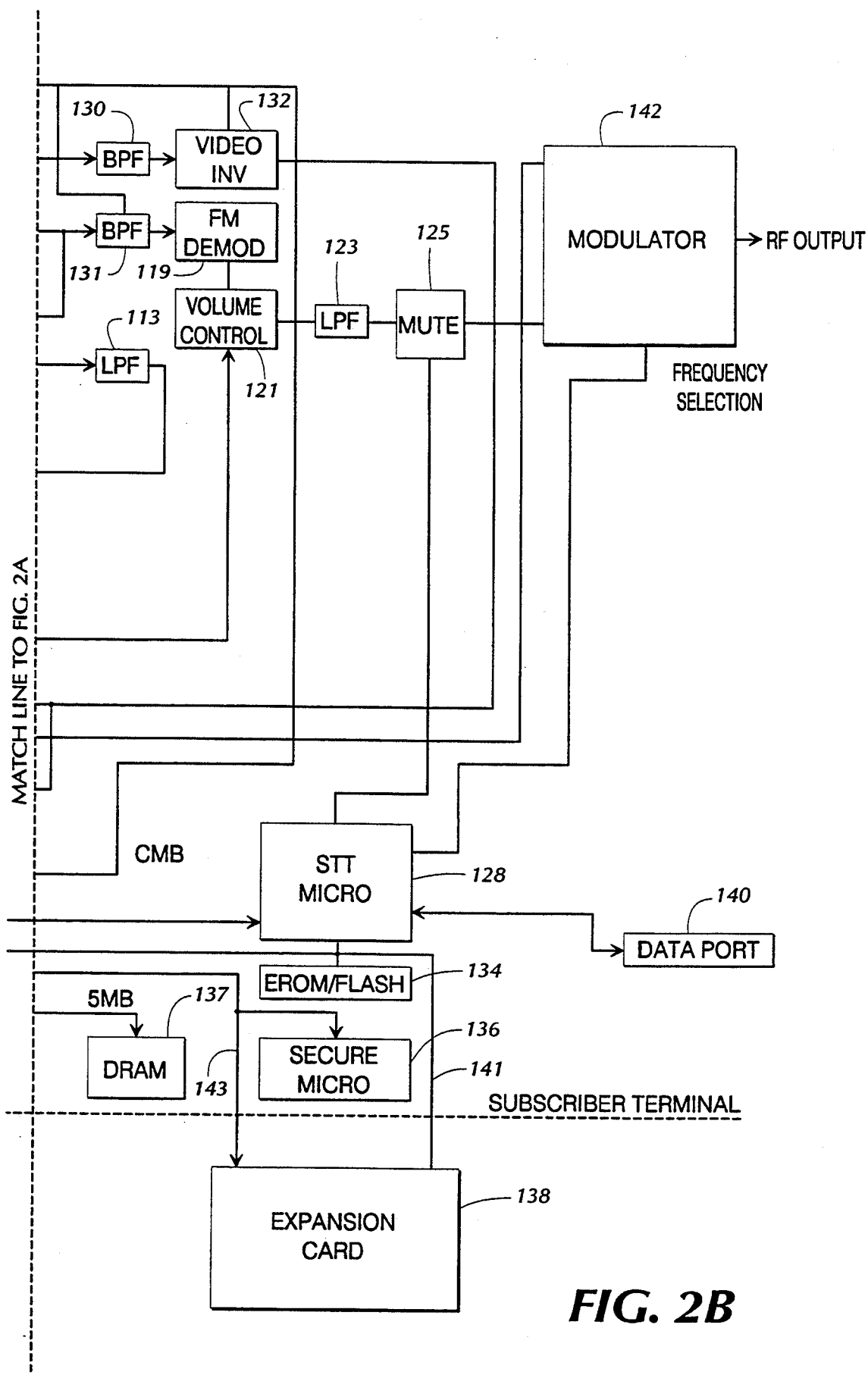

Referring to FIG. 2, a detailed block diagram of one of the subscriber terminals, for example, the one indicated as 40 of the subscription television system will now be described. The broadband television signal from signal distribution system 52 is received at the input of up/down converter or tuner 100. An out-of-band data receiver 150 is also coupled to the broadband input. Conventionally, the up/down converter 100 may include an input filter, such as a diplexer, to separate the 108.2 MHz out-of-band signal and the broadband television signal. The up/down converter 100 can be tuned to a predetermined channel for receiving in-band video and audio data when not in use. The channel may be predetermined from the system manager 12 and, by one of the data transmission methods described herein, the predetermined channel identification can be stored in subscriber terminal 40.

When in use, the up/down converter 100 is tuned according to a channel entered by a subscriber via a user interface having an IR receiver 124, remote control 126 and terminal keypad 122. Up/down converter 100 uses a phase locked loop under the control of a tuning control 102 to convert the selected or predetermined default RF channel signal to a 45.75 MHz intermediate frequency signal. A multifunction control circuit (MCC) 104, preferably an application specific integrated circuit (ASIC) combining many subscriber terminal control and data handling functions into a single package, is linked to up/down converter 100 by a bidirectional link to the tuner control 102. The link has one path for tuning and a return link for feedback control of the tuning process. A feedback signal for automatic gain control and one for automatic frequency control are transmitted to the up/down converter 100 through filters 101, 103, respectively from a video demodulator 109.

A filter, such as a SAW filter 106, filters the IF channel signal to split the signal into separate video and audio portions for further processing. The video portion is demodulated and descrambled by the video demodulator 109 under the control of a descrambler control 110 of the MCC 104. The video demodulator 109 performs the sync restoration (descrambling of the video signal) for sync suppression scrambling. The video signal then passes through a band pass filter 130 and to a video inverter 132 where inverse video inversion (descrambling) takes place. The descrambling of the video portion, whether sync suppression, sync inversion, video line inversion, etc. is under the control of the descrambler control 110 of the MCC 104. The descrambler control 110 provides the necessary timing signals, inversion axis levels, and whether the video is inverted or not to the video inverter 132 and supplies the necessary timing, restoration levels and identification of sync pulses to be restored to the demodulator 109. The descrambler control 110 usually receives such descrambling information from pulses as in-band audio data.

In the other path, the audio signal is converted from the 41.25 MHz IF carrier to the intermodulation frequency of 4.5 MHz by a synchronous detector 105. Feedback for automatic gain control of detector 105 is supplied from the output of band pass filter 131. The audio signal may then be demodulated by an FM demodulator 119. An amplitude modulation detector 111 performs pulse detection to recover the in-band audio data which are amplitude modulated onto the audio carrier. The recovered in-band pulses are supplied to an in-band audio data decoder 117 of MCC 104 for processing after being shaped by pulse shaper 115. The in-band data, except for descrambling data, is stored in DRAM 137 for buffering. Descrambler control 104 accesses descrambling data directly for the video descrambling operation. Volume control of the audio signal is performed under the control of a volume control 118 of the MCC 104 and the microprocessor 128 as described in U.S. Pat. No. 5,054,071, incorporated herein by reference. After volume control, the audio signal is passed through a low pass filter 123 and a mute switch 125. The output of the mute switch 125 is applied to a modulator 142.

The MCC 104 receives the video signal after demodulation and descrambling and strips the in-band video data from the VBI of the signal with a VBI decoder 129. The in-band video data is transmitted at a frequency on the order of known teletext systems, such as about 4.0 megabits per second, and a data clock provides an appropriate sampling frequency higher than the Nyquist rate according to well known techniques. The in-band decoder 129 stores the data in DRAM 137 prior to processing by the microprocessor 128, the DRAM 137 serving as a data buffer.

The output of video inversion circuit 132 is also supplied to an on screen display control 127 of the MCC 104. The on screen display control 127 selectively generates on screen character and graphic displays in place of or overlaid on the video signal. The modulator 142 combines the video signal from the output of the on screen display control 127 and the audio signal from the output of the mute circuit 125 and converts the combined signal to the channel frequency selected by the microprocessor 128, such as channel ¾ for NTSC. The combined and remodulated signal is supplied as an RF output to a television receiver in well known manner.

A control microprocessor 128 controls the overall operation of the subscriber terminal 40. The subscriber communicates to and controls the microprocessor 128 through an interactive user interface with an on screen display. The user interface includes a keyboard 122 on the front panel of the subscriber terminal 40 and the remote 126 which generate subscriber control signals for channel tuning, volume level control, feature selection, and the like. These subscriber control commands are decoded by an input scanner and control 148 of MCC 104. The remote IR receiver 124 of the user interface receives the commands from the infrared (IR) or other remote control 126, as is well known in the art, and provides commands to the microprocessor 128. The user interface additionally includes a 4 digit, 7 segment LED display 120 which displays the tuned channel numbers and diagnostics.

When the keypad 122 or IR remote control 126 is utilized to select a command, the microprocessor 128 operates to execute the command. For example, this operation may be to instruct the tuner control 102 to appropriately control up/down converter 100 to tune a selected channel. The subscriber terminal interacts with the subscriber by providing numerous on screen displays which assist in the operation of the terminal. The on screen displays provide information and prompts to guide the subscriber through many of the complex features of the terminal.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of MCC 104 carries out descrambling on a particular channel or what form of descrambling is required at a particular time by interpreting the authorization and control data downloaded from the system manager 12 (by any of the three data transmission schemes discussed herein, out-of-band, in-band audio or in-band video) into the internal NVM memory of the device. The non-volatile memory (NVM) in the secure microprocessor 136 stores secure data, for example, authorization data, scrambled channel data, scrambling mode data, some terminal configuration data and other required data.

The control microprocessor 128 operates by running a control program which preferably is partially stored in a read-only memory internal to the processor and partially stored in a non-volatile memory such as Flash EPROM memory 134. In addition, the control program of the control microprocessor 128 may also reside in the non-volatile memory of an expansion card 138. The microprocessor 128 communicates with the non-volatile memory 134 and 138 via a memory bus 141 which has data, address, and control lines. In addition, the microprocessor 128 controls the data decoders 117, 129 and 146 and the tuner control 102, volume control 118, on screen display control 127, descrambler control 110 and input key scanner and control 148 via commands through MCC 104 and control microprocessor bus (CMB) 131. The microprocessor 128 also directly controls the mute switch 125 and the output frequency selection of the modulator 142. The microprocessor 128 includes additional capacity for other auxiliary device communications and control through a data port 140.

The memory control 112 permits data coming from the three data decoders 117, 129 and 146 to be placed in a volatile memory such as DRAM 137. There it can be accessed by the control microprocessor 128 via the CMB 131. The MCC 104 also distributes control instructions from the control microprocessor 128 to the other parts of the MCC 104 to provide operation of the rest of the subscriber terminal 40. The MCC 104 additionally connects to a secure microprocessor bus (SMB) 143 which permits communications between the secure microprocessor 136 and other portions of the subscriber terminal 40. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests to write to memory or read from memory from the microprocessors 128, 136 and the other controls and data decoders. It resolves contentions for memory transfers, giving priority to real time applications and the microprocessors, and schedules the data flow. The microprocessors 128 and 136 communicate through internal registers of the MCC 104 with the memory control 112 and other portions of the MCC.

The expansion card 138 is a printed circuit card which contains memory and/or secure microprocessor components, which can be plugged into a connector 200. The connector 200 electrically extends the control microprocessor memory bus 141 and the secure microprocessor bus 143 to the expansion card 138. Additional program or data memory, or renewed security can be provided by the expansion card 138.

The subscriber terminal may optionally include an impulse pay-per-view (IPPV) module of either the telephone type 152 or the RF-IPPV type 154. The IPPV module allows the subscribers to request authorization of their subscriber terminal 40 to receive pay-per-view events, store the data associated with the purchase of the event in the non-volatile memory of the secure microprocessor 136, and then transmit the data to the system manager 12 via the telephone return path or the RF return path via the signal distribution system 52.

Figure 3:
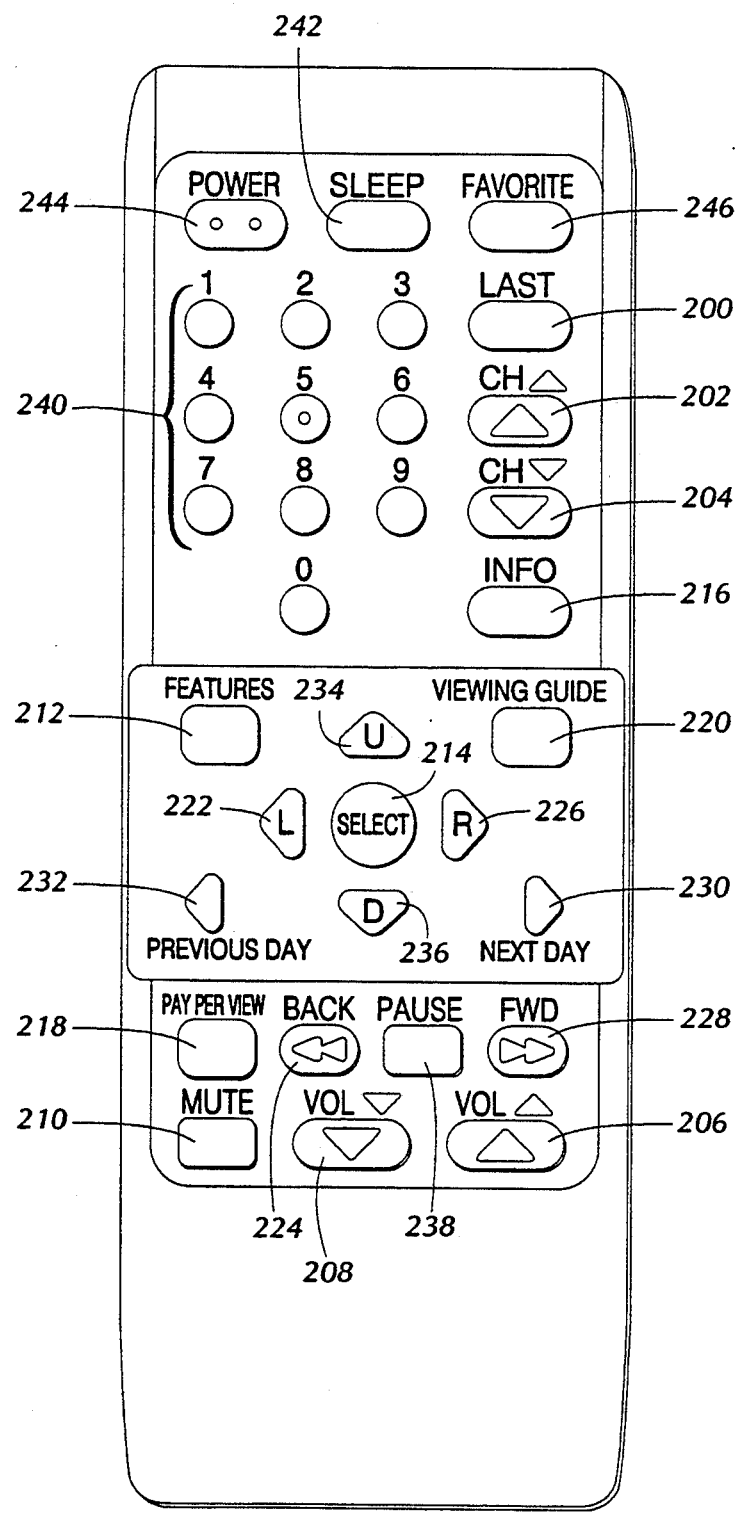
FIG. 3 is a pictorial representation of the key functions of the remote control of the subscriber user interface to the subscriber terminal illustrated in FIG. 2.

FIG. 3 illustrates the key configuration of the remote control 126 of the user interface. The remote control keys are a part of the interactive user interface which in combination with the on screen displays provides a user friendly environment for the subscriber and a facility of use for the features of the subscriber terminal 40. The keys direct the subscriber terminal 40 to operate in the following manner.

The LAST key 200 toggles the tuning of the subscriber terminal 40 between the last two previously viewed channels. In the features mode, this key will cause the subscriber terminal 40 to return to the previous on screen display. The CH (up) key 202 increments the channel tuned for the subscriber terminal 40. While in the program guide feature, this key moves the cursor down by one channel. The CH (down) key 204 decrements the channel tuned for the subscriber terminal 40. While in the program guide feature, this key moves the cursor up by one channel. The VOL (up) key 206 increases the volume, except when the volume is muted, in which case the key restores the last volume setting. The VOL (down) key 208 decreases the volume, except when the volume is muted, in which case it restores the last volume setting. The MUTE key 210 toggles the volume mute feature where if the volume is muted, it becomes normal and if the volume is normal, it becomes muted.

The FEATURES key 212 accesses the initial on screen menu when the subscriber terminal is on. From within a menu, this key cancels the feature mode and removes all on screen menus. The SELECT key 214, in an on screen menu, initiates the action pointed to by the highlight, or causes the terminal 40 to do what is defined on the screen. This key also terminates direct channel entry if pressed before all digits are entered. The INFO key 216, when pressed while terminal 40 is in the on mode, causes time, channel number, program content and program source information to overlay the transmitted video for 4 seconds. The key also displays sleep timer status. When the key is pressed in the viewing guide mode, a detailed description of the highlighted program appears. The PAY-PER-VIEW key 218, when the subscriber terminal is tuned to an IPPV channel with a program event with a purchase window open, initiates a buy sequence for that event. When not tuned to an IPPV channel, this key accesses up the theater feature menu.

The VIEWING GUIDE key 220 accesses the viewing guide feature menu any time the subscriber terminal is on and not in another on screen menu. From within the viewing guide feature menu, this key cancels the activity and removes the viewing guide feature menu. The LEFT key 222, while in the program guide feature, moves the cursor to the left 30 minutes. In an on screen menu, this key moves the highlight bar to the left if there is more than one column of available selection. The BACK ARROW key 224, during the NVOD events, takes the subscriber to a later showing (which is earlier in the event by one offset time increment). The RIGHT key, 226 while in the program guide feature, moves the cursor to the right 30 minutes. In an on screen menu, this key moves the highlight bar to the right if there is more than one column of available selection. The FORWARD ARROW key 228, during NVOD events, takes the subscriber to an earlier showing (which is later in the movie by one offset time increment).

The NEXT DAY key 230, while in the program guide feature, moves the entire screen to the right by one day (24 hours). The cursor returns to the upper left hand cell of the screen. The PREVIOUS DAY key 232, while in the program guide feature, moves the entire screen to the left by one day (24 hours). The cursor returns to the upper left hand cell of the screen. The UP key 234, while in the program guide feature, moves the cursor up one channel. In an on screen menu, this key moves the highlight bar up to the next available selection. The DOWN key 236, while in the program guide feature, moves the cursor down one channel. In an on screen menu, this key moves the highlight bar down to the next available selection. The PAUSE key 238, during NVOD events, causes the current showing of the event to pause until the next start time.

The Numeric Keys (0–9) 240, within menus requesting channel numbers, directly enter channel numbers. During the parental control feature, IPPV access and other number entries, these keys enter identification codes. The POWER key 224 toggles the subscriber terminal 40 on and off. The SLEEP key 242 causes the sleep timer on screen display and menu options to appear. The FAVORITE key 246 tunes the subscriber terminal to a preselected channel chosen by the subscriber.

A near video on demand event transaction is more fully disclosed in FIG. 4. The transaction provides a number of parameters which are downloaded from the headend 10 to each subscriber terminal for each program event in a NVOD system. The system provides the information as a global transaction transmitted to all subscriber terminals in the VBI of the video signal. The event transaction data is decoded by the VBI decoder and stored in the event portion of the DRAM until it is needed by the subscriber terminal 40. The program event transactions include two initial bytes of event identification for the program event. The total event data to describe a NVOD program event is generally six transactions (ED1–ED6) in length. In the first transaction ED1, next is a byte which indicates when the event may be previewed. Thereafter, two bytes are taken up by a number indicating the channel on which the event will be displayed. Following the display channel information, are two bytes indicating the maximum number of showings of the program event. A byte indicating when the program event may be purchased follows this information. Thereafter, there are 3 bytes indicating frequency on which the on screen barker channels may be viewed to see the preview. Another byte showing the attributes of the event indicates the rating of the program event, and whether or not to mute it or to blank it, and another 3 bits for control purposes. Following this basic information the transaction indicates the starting time and the interval between each starting time.

The second and third transactions ED2, ED3 indicate the number of frequencies used for the NVOD channel and provides a byte for listing each frequency up to 24 frequencies. The third transaction ED3 also includes information as to the length of the event (2 bytes) and the end time of the program event (6 bytes). In transaction ED4, 8 bytes are reserved for the mode types allowed for in the program event. In the fourth and fifth transaction ED4, ED5, 24 bytes are reserved for PPV definition purpose. The last transaction ED6 contains 16 bytes for miscellaneous data, which, for example, may be used for an ANI number (an on screen display number which the subscriber calls to order the program event).

Figure 5A:
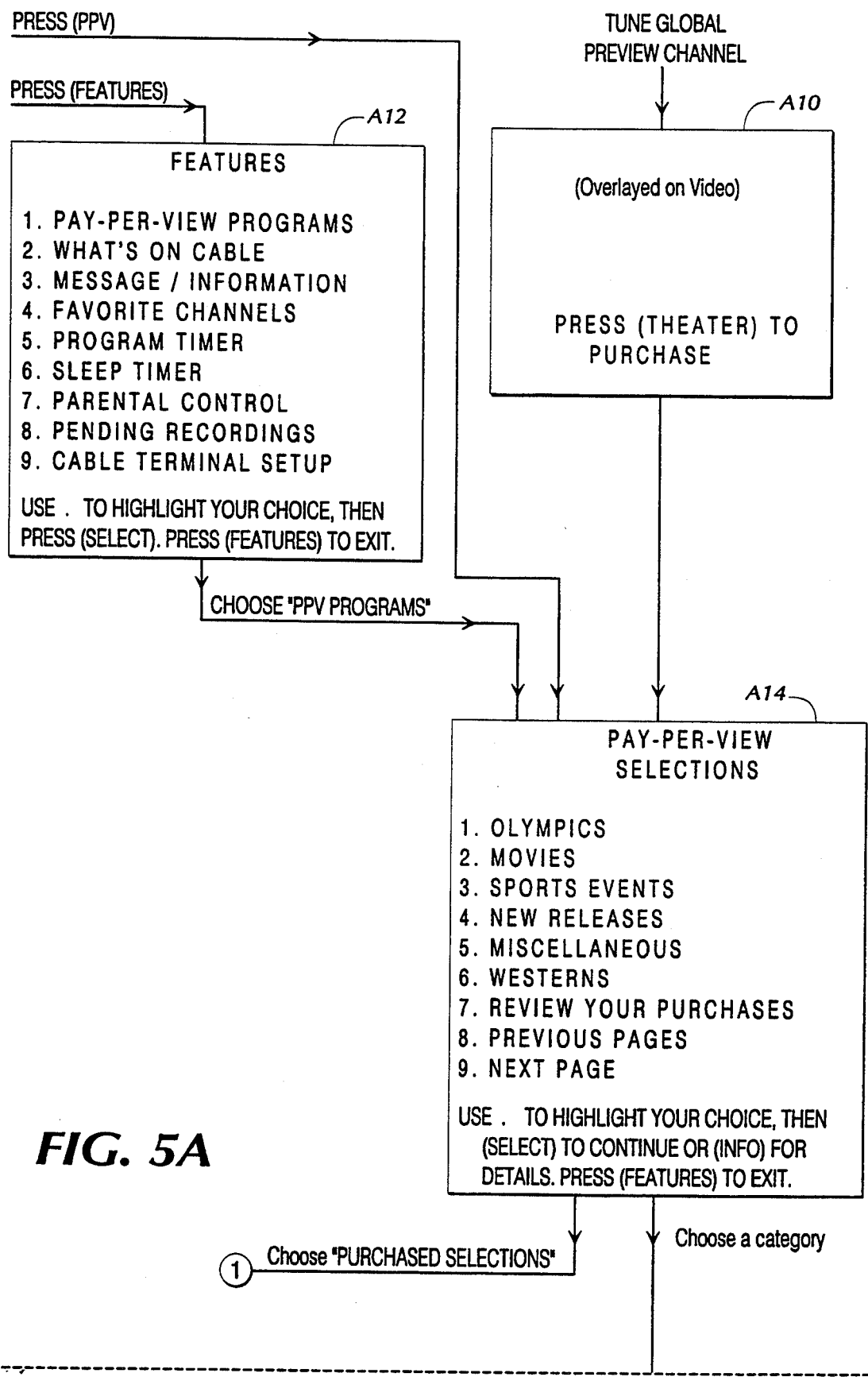
FIGS. 5-7 are a pictorial representation of the on screen display operation for a NVOD service for the subscriber terminal illustrated in FIG. 2.
Figure 5B:
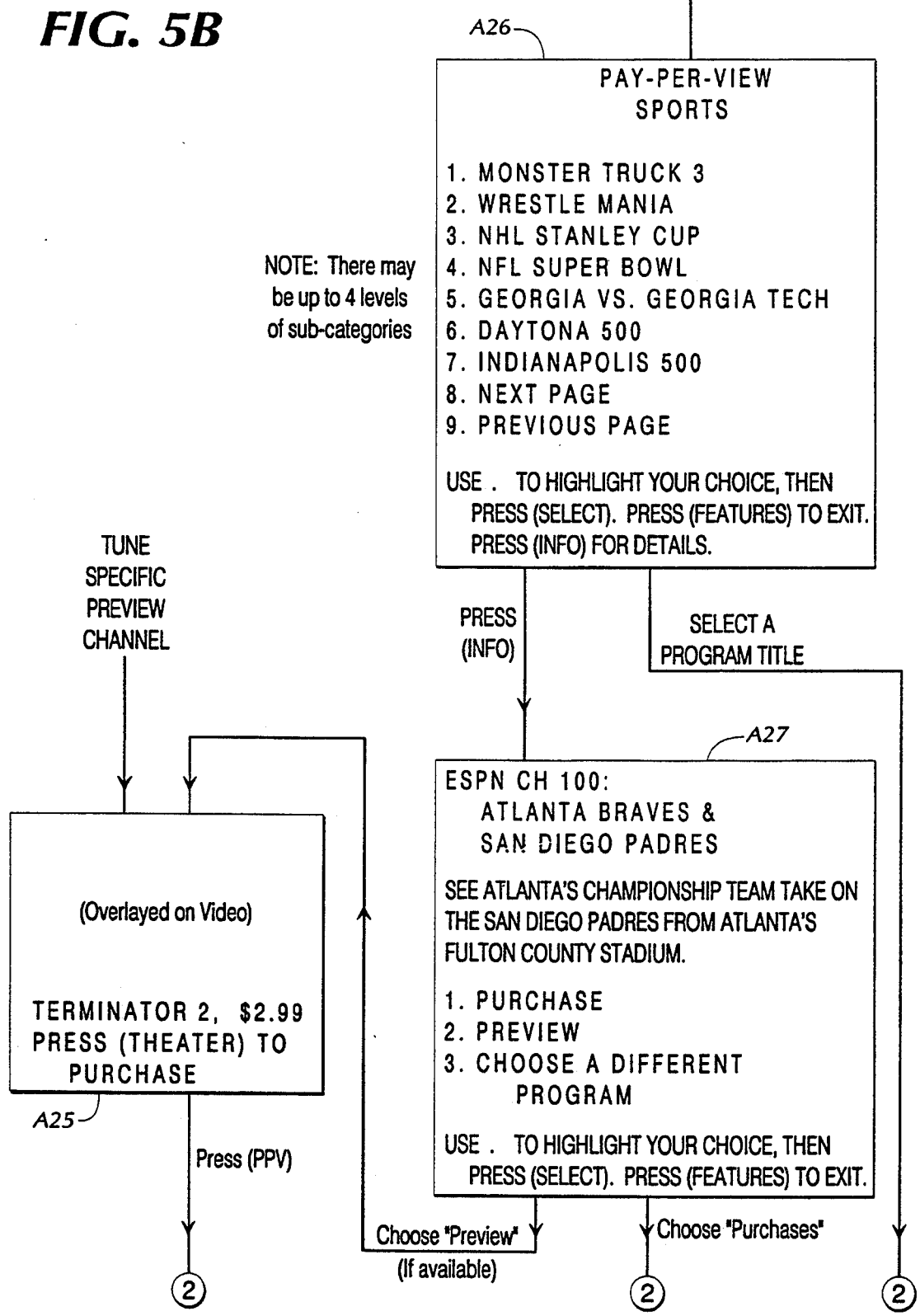
Figure 6A:
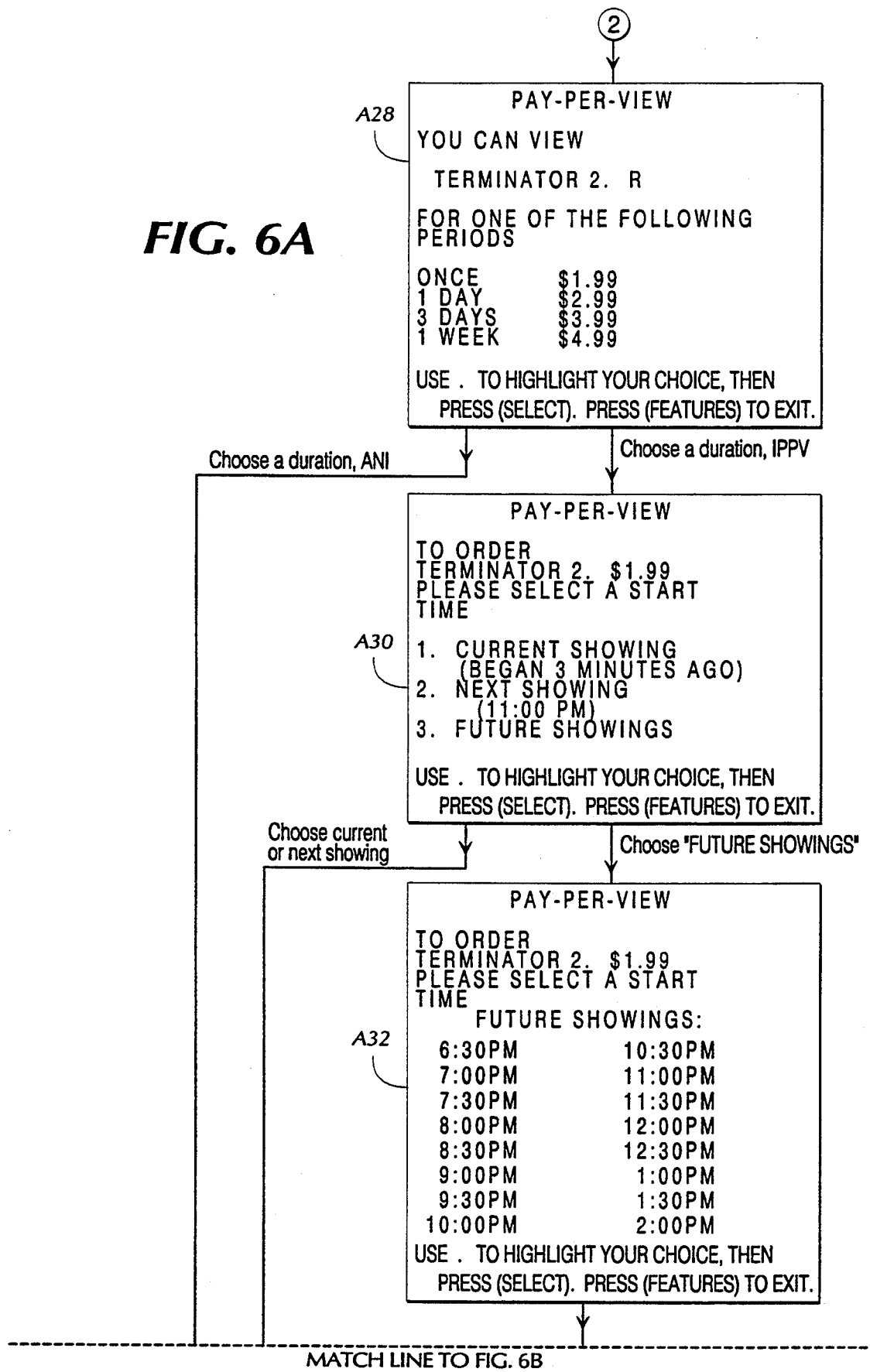
Figure 6B:
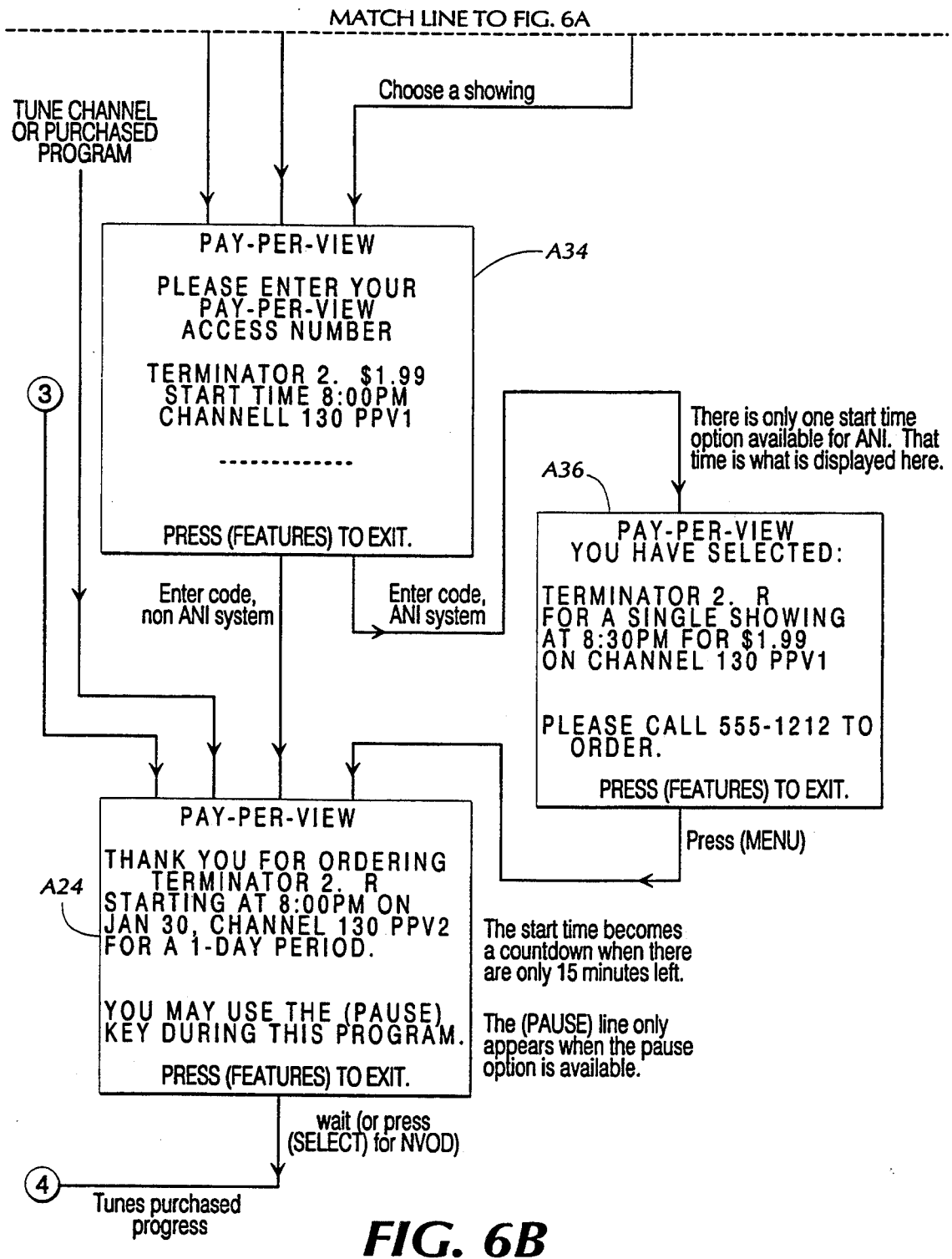
Figure 7A:
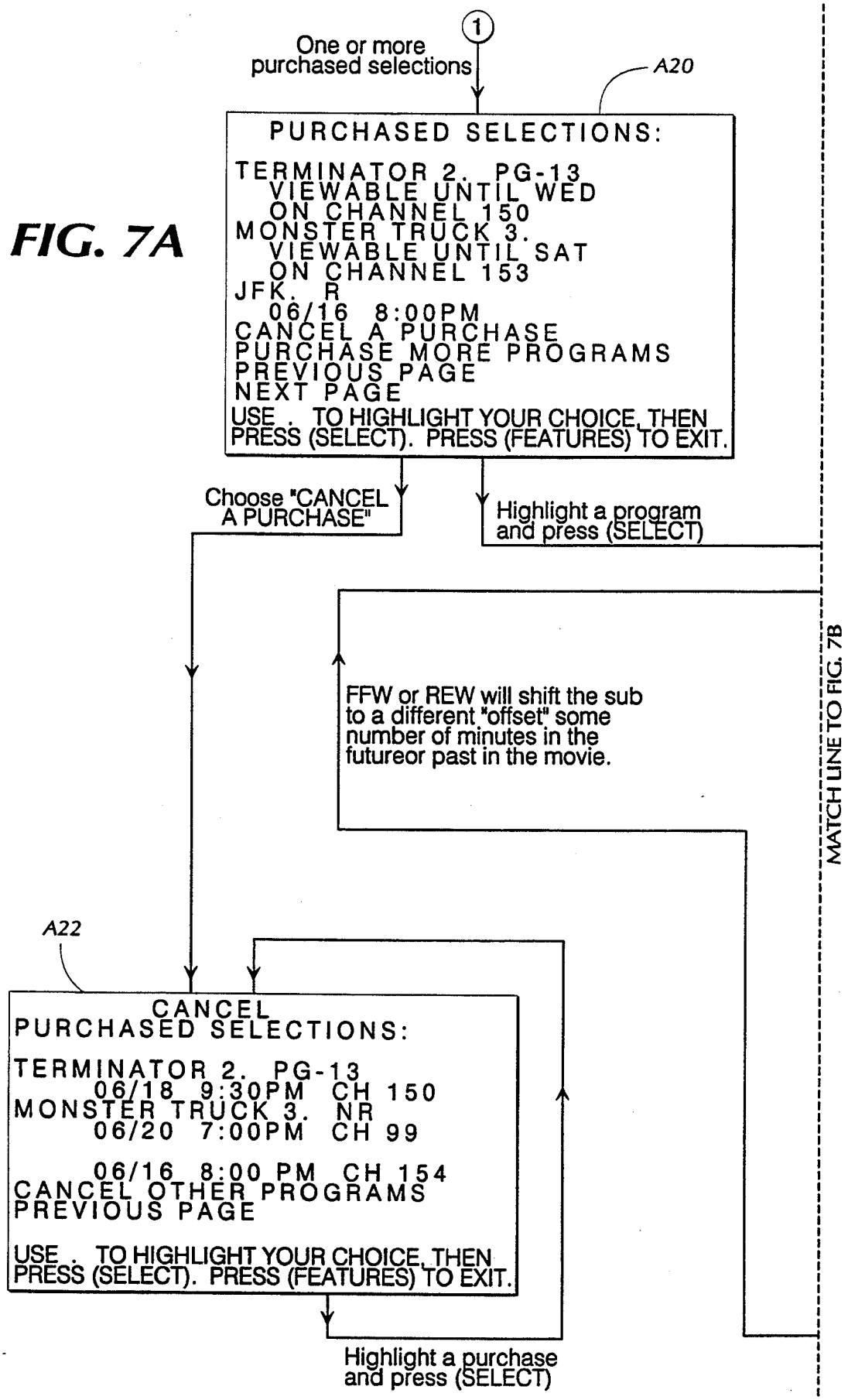

The subscriber terminal provides an on screen display interface for ordering the NVOD service. The NVOD service is provided by the same general operation used for pay-per-view and impulse pay-per-view selections as shown in FIGS. 5–7. There are several methods of initiating a pay-per-view sequence for the subscriber terminal 40. Initially, if the subscriber has tuned a global preview channel in block A10 he may watch the preview and be prompted with the message to press the PPV key to purchase one of the program events he is previewing. Alternatively, he may press the PPV key from any channel which he is tuned to which takes him to block A14. As another method, if the features key is pressed, the features menu in block A12 has a selection for choosing PPV programs which takes the subscriber to the pay-per-view selection screen A14.

If the subscriber has already chosen a number of pay-per-view selections he may choose the menu item indicated as 7 in block A14 which will allow him to review his purchases. If he has not made any purchases, he will view the on screen display of block A16 (FIG. 7) and can either exit by pressing the features key or can select (buy) the presently showing program event by pressing the select key which will transfer him to viewing the program in block A18. Alternatively, if the subscriber has purchased one or more program events, then the purchase selection screen in block A20 will appear. The menu in the purchased selection screen allows the subscriber either to select one of the purchased program events or to cancel a purchase. If the subscriber cancels a purchase the screen in block A22 allows him to confirm the cancellation with the select key and then exit with the features key.

If, however, from block A20 the subscriber wishes to view one of his purchased programs, highlighting the program and selecting it will transfer the subscriber terminal to the screen illustrated in block A24 (FIG. 6). In this block the time of the program event and other information are displayed. If the program event has been bought for more than one pay-per-view, and the event is being shown as an NVOD channel, then the subscriber may press the select key and have the subscriber terminal 40 tune to the program event in block A18 (FIG. 7). The program event, if it is a NVOD event, will be playing continuously and the subscriber will tune to the version presently in progress. As mentioned previously in block A18 the subscriber may use the pause, fast forward or rewind functions as will be more fully described hereinafter. Another basic method of entering the on screen display in block A24 is to initially tune the channel of a purchased program directly.

Alternatively, from the screen in block A14, the subscriber may initiate a pay-per-view selection process by choosing a category of available pay-per-view program events. The particular category that he has chosen will appear with a list of the selections for that category as shown in block A26. Selection of the program event in block A26 will produce an on screen display for choosing the method of purchase in the screen shown in block A28. For a single pay-per-view event the only choice will be once and the price of the selection. However, if the selection is one of the NVOD channels from the NVOD service, then several time durations can be purchased for differing prices.

Once the subscriber has chosen the viewing mode that he wishes, the subscriber terminal 40 will determine whether the method of returning this information to the headend for billing and authorization is a RF or telephone return path. For either a RF or telephone return path, another screen A30 allows the subscriber to select either the current showing, the next showing, or any future showings. If the subscriber selects the future showings option, then the screen in block A32 provides a series of start times as options which may be selected by pressing the select key. When a current, next or future showing has been chosen, a screen A34 may be displayed to request that the subscriber enter his access number. After the pay-per-view access number is entered the subscriber terminal will display the screen illustrated in block A24 to allow the subscriber to wait until the program event starts or he selects the present showing of the near video on demand event. If the subscriber terminal 40 has neither an RF or telephone return path, then another screen A36 must be entered from the screen A34 where the ANI number to order the event is displayed. After the subscriber calls the telephone number and the program has been authorized, the screen A24 will appear and allow him to view the program.

Figure 8:
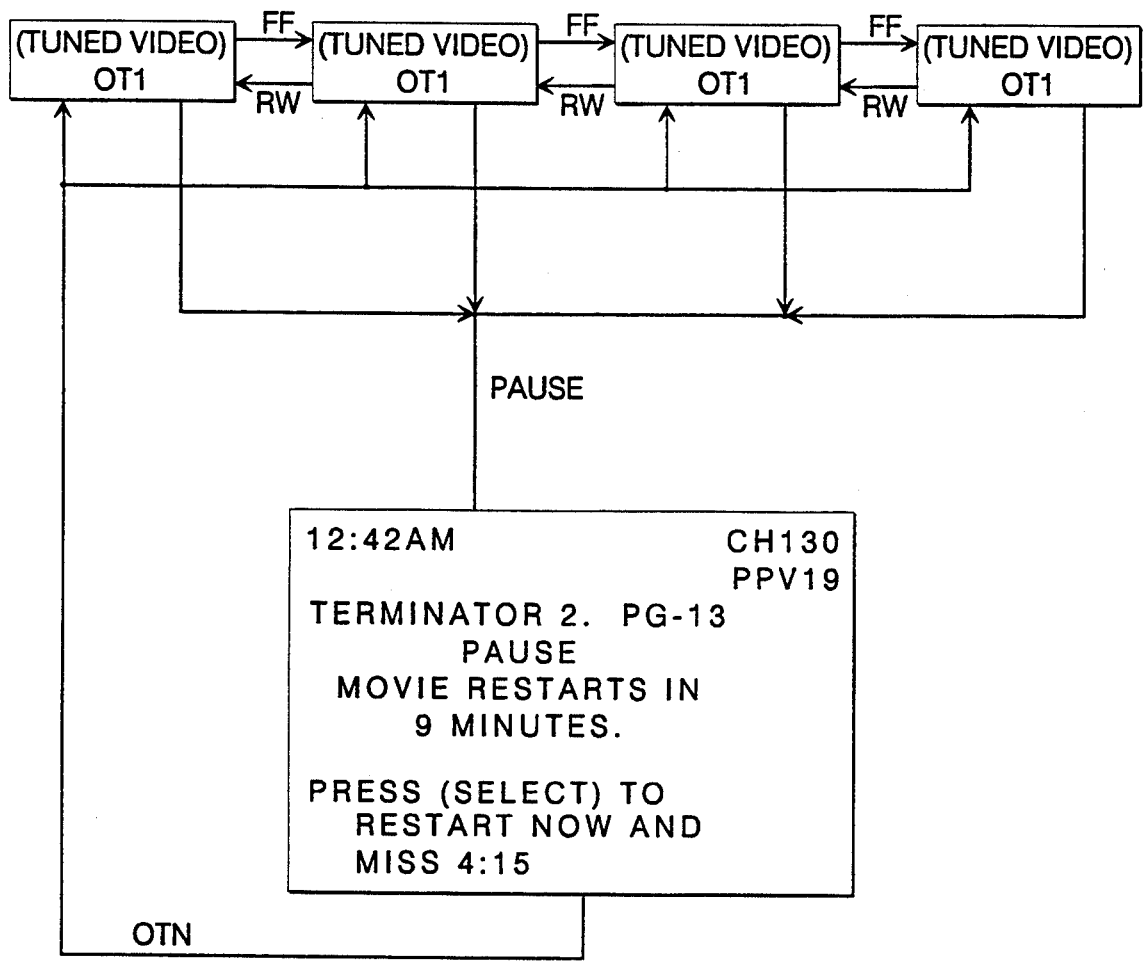
FIG. 8 is a pictorial representation of the time shifting operation to different offset time increments performed by the invention.
Figure 9:
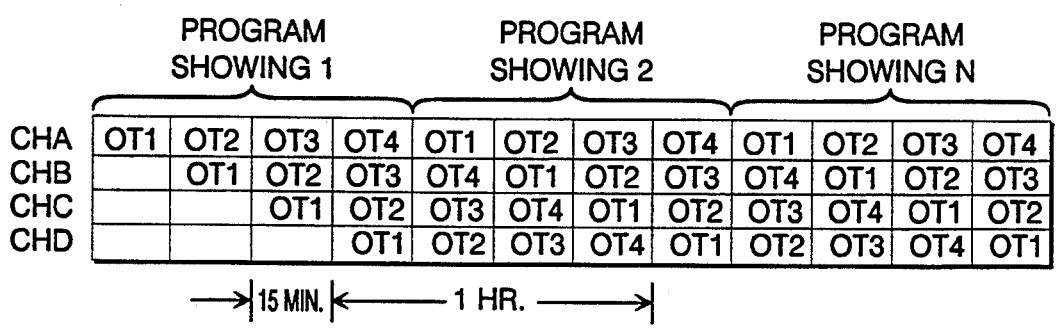
FIG. 9 is a pictorial represent of the channel frequencies and the program event offsets for a near video on demand service.

The time shifting feature operation can be viewed by reference to FIGS. 8 and 9. FIG. 9 is a channel mapping with respect to time of a near video on demand program service. In this service a program event, for example, a movie, is shown continuously and sequentially on a plurality of channels. Each of the channels, channels A-D, have the program offset to start at a different offset time OT1-OT4. In the illustrated figure, the program event is 1 hour in length, the offset times are each 15 minutes in length, and there are 4 channels of continuous and sequential broadcasting of the program event. The service provides the ability for the subscriber to watch the program event at any time by waiting at most 15 minutes. It is noted that the waiting time can be decreased proportionally by the number of channels of the service which in turn is based upon the number of increments or time offsets that a program event is divided into and their length. The more offset increments the program event has, the nearer the service will become to real video on demand.

The feature of the present invention enhances this NVOD service by providing the subscriber with user friendly features which emulate the VCR functions of pause, fast forward, and rewind. FIG. 8 illustrates in a functional manner the operation of the time shifting feature by the subscriber terminal 40. Blocks A10, A12, A14 and A16 show the television receiver display which the subscriber views and the arrows and key descriptors disclose the key presses on the remote control 126 with which the subscriber operates the feature.

The subscriber initially tunes one channel A-D of the NVOD service. The method by which the subscriber accomplishes this can be in a number of ways such as directly turning the channel, buying the event from a PPV menu, selecting the channel for later viewing with a program timer, etc. as was previously described. The subscriber, when he wishes to utilize the fast forward operation of the feature, presses the FORWARD key 228 on the remote control 126. The key instruction is decoded and in response to the instruction, the subscriber terminal 40 tunes to the channel of the NVOD service having the next offset time increment, for example, OT1 to OT2. This time increment is from the channel which was started one offset time period earlier than the presently watched channel. It appears to the viewer that he is moving forward in time by fast forwarding through the program event to later times. Successive key presses of the last FORWARD key 228 will cause the subscriber to see all subsequent offset time increments until the last increment where the process will stop. The subscriber can with this option skip the viewing of segments of a particular program event and watch other segments of more interest to him and, in combination with the rewind feature, watch them in any order.

The rewind operation of the feature works in opposite to the fast forward feature. The subscriber, from a tuned NVOD channel, presses the BACK key 224 on the remote control 126 and the subscriber terminal 40 will tune to the channel of the NVOD service having the previous offset time increment, for example OT2 to OT1. This time increment is from the channel having the program event started one time increment later than the presently watched channel. It appears to the viewer that he is moving backward in time by rewinding through the program event to earlier times. Successive key presses of the BACK key 224 will cause the subscriber to view all previous offset time increments until the first increment where the process will stop.

During any of the time increments on any channel, the subscriber may want to pause while viewing a NVOD event and return to viewing the event at a later time. The pause feature of the present invention provides this function by replacing the program event with a pause screen as shown in FIG. 8. The pause screen informs the subscriber of the time, channel identification and event identification. The screen further informs the subscriber of the title of the event which has been paused. Additionally, the pause screen provides two timers and display screen explanations which inform the subscriber of how soon the program event will restart or, alternatively, how much of the program event will be missed if the program is restarted before the pause is completed. When the pause timer has timed out, the subscriber terminal tunes to the channel with the offset time increment which started the program event one offset increment later than the channel from which the pause feature was entered. This feature allows the subscriber to stop viewing the program event for one offset time increment and essentially restart viewing it at the same place in the event. In combination the fast forward, rewind and pause features provided by the invention create a flexible and user friendly environment for the subscriber to increase his enjoyment of the NVOD service.

Figure 10:
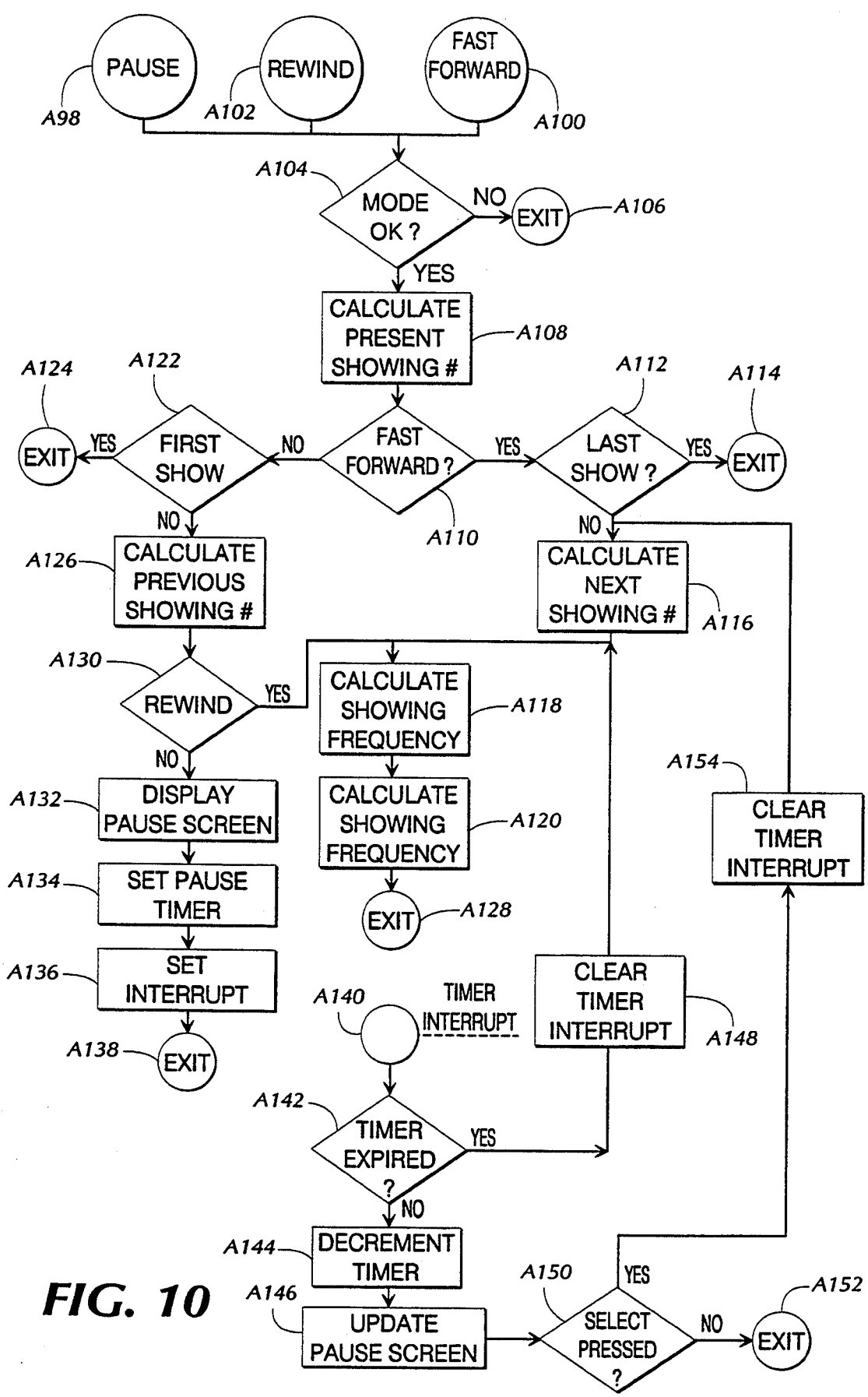
FIG. 10 is a detailed flow chart of the time shifting features of pause, fast forward and rewind for the subscriber terminal illustrated in FIG. 2.

FIG. 10 illustrates the detailed functional flow chart of the operation of the time shifting features of the subscriber terminal 40. In the figure, when the PAUSE key 238 (pause), the BACK key 224 (rewind) or the FORWARD key 228 (fast forward) is pressed by the subscriber, the input scanner stores the control code and transfers control to this part of the program when the processor has time. Entry of the program begins at block A98 for the pause function, at block A102 for the rewind function, and at block A100 for the fast forward function. Initially, the control microprocessor 128 checks the program event table to determine if the mode for this particular program event is okay. If the mode is not okay, the program will exit through block A106 to the basic foreground routines. The mode check is to determine whether the subscriber purchased the event in a mode that allows the selected function, and whether or not the present channel is showing a NVOD event. If either of these basic criteria are not present, then the key should not function and is ignored by the subscriber terminal 40.

If the mode check is affirmative, the program flows to block A108 where a calculation is made of the present showing number. The information for determining the present showing number is obtained from the event table entry for the program event and the real time clock. From the event identifier, the event start time, and the present time the calculation of the present showing number can be made. After the present showing number is calculated, the program determines in what mode the program is operating via block A110. If the fast forward operation has been requested, the program branches to block A112 while if the rewind or the pause functions have been selected, the program will branch to block A122.

The fast forward function will now be more fully described with respect to the branch starting at block A112. In that block, the program tests to determine whether or not the present showing number is the last show. If it is, the system cannot fast forward any further and exits at block A114. This essentially ignores the key press of fast forward when it should not function. If the program can still fast forward to subsequent showings, it will calculate from the program event table what the next showing number is in block A116. Subsequently, in block A118 the channel frequency will be calculated from the showing number and the system will tune to that frequency in block A120. This moves the subscriber ahead one offset time increment so that the program event appears to be fast forwarding towards the end of the event. At that point, the program exists in block A128.

A similar method is used for rewind by first entering a branch in block A122. The program initially tests whether the present showing number is the first show. If it is, then the program exits and ignores the key press. This is because the operation should not rewind past the earliest show. If the test in block A122 is negative, the program will advance to block A126 and calculate the previous showing number. The program then branches again to block A130 by determining if this is the rewind function. If it is, the program will subsequently calculate the showing frequency from the previous showing number, tune that frequency, then exit through blocks A118, A120 and A128, respectively. This essentially moves the subscriber back in time one offset time increment thereby appearing to rewind the program toward the initial starting point.

The operation of the pause feature is similar and follows from block A98 through blocks A104, A108, A110, A122, A126 and A130 to where the test in that block is negative. The negative test in block A130 indicates the third function of pause is present and this branch is to be executed. The pause display screen for the on screen display is generated on the television receiver in block A132 before a pause timer is set in block A134 and a pause interrupt is set in block A136. The program then exits to the other foreground routines in block A138. When the pause timer interrupts, for example every second in block A140, it enters the branch to determine whether the timer has expired. The pause timer is generally set for one offset time increment, in the present implementation, 15 minutes. When the timer has elapsed, then the previously showing should be tuned to. This will allow the subscriber to view the program at the same point at which he left it one offset time increment before. This will be the affirmative branch from block A142 which flows through block A148 where the timer interrupt is cleared before entering blocks A118, A120, and A128 which calculate the showing frequency and tune the showing frequency from the previous showing number.

If, however, the timer has not expired and the pause function is still waiting for the offset increment duration, the negative branch of block A142 causes the timer to be decremented in block A144 and the pause screen display to be updated in block A146. The program then checks to determine if the select key has been pressed in block A150 and exits on a negative determination in block A152. Thus, the program will loop every second or predetermined period of time on the timer interrupt until either the timer expires or the select key is pressed. If the select key is pressed, an affirmative branch from block A150 immediately takes the program to block A116 through block 154. At block A154 the timer interrupt is cleared prior to calculating the next showing number in block A116. This is the same showing number that the program entered for the pause function on. Thereafter, the showing number tuning frequency is calculated in block A118, the calculated frequency tuned to by the system in block A120, and the program then exits in block A128.

While there has been shown and described the preferred embodiments of the inventions, it will be evident to those skilled in the art that various modifications may be made thereto without departing from the spirit and scope of the invention as set forth in the appended claims.

What is claimed is:

1. A method of time shifting the viewing of a programmed event in a near video on demand (NVOD) system including a plurality of near video on demand channels, each channels having the event shown spontaneously and sequentially on each of the channels, but time shifted a different number of predetermined time increments, wherein each programmed event has a first show interval, a last show interval and a plurality of show intervals therebetween and wherein the duration between show intervals is equal to the duration of the predetermined time increments, the method comprising the steps of:

viewing the programmed event on a preset NVOD channel;

periodically providing a present showing number which corresponds to the relative time that has passed since a start of the programmed event;

selecting a forward time shift for viewing the program event;

determining if the present showing number is during a last show interval when the forward time shift is selected;

tuning in response to said forward time shift being selected from the present NVOD channel to a NVOD channel carrying the program event which started the event one time increment later than the present NVOD channel when the present showing number is determined to occur before the last show interval; and preventing tuning in response to said forward time shift being selected when the present showing number is determined to occur during the last show interval.

2. A method of time shifting the viewing of a programmed event in a near video on demand system (NVOD) including a plurality of near video on demand channels, each channels having the event shown spontaneously and sequentially on each of the channels, but time shifted a different number of predetermined time increments, wherein each programmed event has a first show interval, a last show interval and a plurality of show intervals therebetween and wherein the duration between show intervals is equal to the duration of the predetermined time increments, the method comprising the steps of:

viewing the programmed event on a preset NVOD channel;

periodically providing a present showing number which corresponds to the relative time that has passed since a start of the programmed event;

selecting a backward time shift for viewing the program event;

determining if the present showing number is during a first show interval when the backward time shift is selected;

tuning in response to said backward time shift being selected from the present NVOD channel to a NVOD channel carrying the program event which started the event one time increment earlier than the present NVOD channel when the present showing number is determined to occur after the first show interval; and preventing tuning in response to said backward time shift being selected when the present showing number is determined to occur during the first show interval.

3. A method of time shifting the viewing of a programmed event in a near video on demand (NVOD) system including a plurality of near video on demand channels, each channels having the event shown spontaneously and sequentially on each of the channels, but time shifted a different number of predetermined time increments, the method comprising the steps of:

viewing the programmed event on a present NVOD channel;

selecting a pause time shift while viewing the programmed event;

tuning from the present NVOD channel to a second NVOD channel carrying the program event which started the event one time increment later than the present NVOD channel;

indicating on the viewing screen of the device on which the programmed event is being viewed a value corresponding to the relative time between the present time and the time until a same event viewed on the present NVOD channel when the pause time shift was selected occurs on the second NVOD channel; and periodically decrementing the value indicated on the viewing screen until the same event occurs on the second NVOD channel.

4. The method of time shifting the viewing of a programmed event as recited in claim 2 further comprising the steps of:

determining if the present showing number is during a first show interval by:

(1) providing an indication of the time of the start of the viewed programming event;

(2) determining a difference time corresponding to the difference between the present time when the backward time shift is selected and the start time;

(3) comparing the difference time and time of the predetermined time increment; and (4) indicating that the present showing number is during the first show interval when the difference time is less than the time of the predetermined time increment.

* * * * *